(12) United States Patent
Levasseur et al.

(10) Patent No.: US 8,707,713 B2
(45) Date of Patent: Apr. 29, 2014

(54) COOLING HOLE WITH CRENELLATION FEATURES

(75) Inventors: Glenn Levasseur, Colchester, CT (US); Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/544,107

(22) Filed: Jul. 9, 2012

(65) Prior Publication Data

US 2013/0205802 A1 Aug. 15, 2013

Related U.S. Application Data

(60) Provisional application No. 61/599,366, filed on Feb. 15, 2012, provisional application No. 61/599,376, filed on Feb. 15, 2012, provisional application No. 61/599,372, filed on Feb. 15, 2012.

(51) Int. Cl.
*F02C 7/12* (2006.01)

(52) U.S. Cl.
USPC .............................. 60/806; 60/752

(58) Field of Classification Search
USPC ................... 60/752–760, 806; 415/115–116; 416/96 R, 97 R
See application file for complete search history.

(56) References Cited

U.S. PATENT DOCUMENTS

| | | |
|---|---|---|
| 4,197,443 A | 4/1980 | Sidenstick |
| 4,529,358 A | 7/1985 | Papell |
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |

(Continued)

FOREIGN PATENT DOCUMENTS

| | | |
|---|---|---|
| EP | 1326007 A2 | 7/2003 |
| EP | 1609949 A1 | 12/2005 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Phutthiwat Wongwian
(74) *Attorney, Agent, or Firm* — Kinney & Lange

(57) ABSTRACT

A gas turbine engine component includes a wall having first and second wall surfaces and a cooling hole extending through the wall. The cooling hole includes an inlet located at the first wall surface, an outlet located at the second wall surface and a diffusing section in communication with the inlet and extending to the outlet. The diffusing section includes a plurality of crenellation features that encourage lateral spreading of cooling air flowing through the cooling hole.

22 Claims, 9 Drawing Sheets

(56) References Cited

U.S. PATENT DOCUMENTS

| | | |
|---|---|---|
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,300,252 B2 * | 11/2007 | Liang .................. 416/97 R |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,092,177 B2 * | 1/2012 | Liang .................. 416/96 R |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2005/0286998 A1 | 12/2005 | Lee et al. |
| 2006/0163211 A1 * | 7/2006 | Pietraszkiewicz et al. 219/69.17 |
| 2008/0003096 A1 | 1/2008 | Kohli et al. |
| 2008/0031738 A1 | 2/2008 | Lee |
| 2008/0145208 A1 | 6/2008 | Klasing et al. |
| 2009/0013695 A1 | 1/2009 | Dierberger et al. |
| 2009/0304499 A1 | 12/2009 | Strock et al. |
| 2010/0068032 A1 | 3/2010 | Liang |
| 2010/0068068 A1 | 3/2010 | Liang |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2012/0051941 A1 | 3/2012 | Bunker |
| 2012/0167389 A1 | 7/2012 | Lacy et al. |

OTHER PUBLICATIONS

International Search Report and Written Opinion, dated Nov. 8, 2013, for PCT Application No. PCT/US2013/025694, 14 pages.

* cited by examiner

COOLING HOLE WITH CRENELLATION FEATURES

CROSS-REFERENCE TO RELATED APPLICATIONS

This application claims priority to U.S. Provisional Application No. 61/599,376, filed on Feb. 15, 2012 and entitled "COOLING HOLE WITH CRENELLATION FEATURES", U.S. Provisional Application No. 61/599,372, filed on Feb. 15, 2012 and entitled "MULTI-LOBED COOLING HOLE AND METHOD OF MANUFACTURE", and U.S. Provisional Application No. 61/599,366, filed on Feb. 15, 2012 and entitled "EDM METHOD FOR MULTI-LOBED COOLING HOLE", the disclosures of which are incorporated by reference in their entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component includes a wall having first and second wall surfaces and a cooling hole extending through the wall. The cooling hole includes an inlet located at the first wall surface, an outlet located at the second wall surface and a diffusing section in communication with the inlet and extending to the outlet. The diffusing section includes a plurality of crenellation features.

A wall of a component of a gas turbine engine includes first and second surfaces and a cooling hole extending between an inlet at the first surface and an outlet at the second surface. The cooling hole includes a diffusing section in communication with the metering section and terminating at the outlet and a plurality of crenellation features.

A wall having first and second surfaces includes a cooling hole with a plurality of crenellation features. A method for producing the cooling hole includes forming an inlet at the first surface, forming a diffusing section between the inlet and an outlet at the second surface and forming a plurality of crenellation features in the diffusing section. The inlet meters a flow of fluid through the cooling hole, and the diffusing section distributes the flow of the fluid to form a film of cooling fluid at the outlet at the second surface of the gas turbine engine wall.

DETAILED DESCRIPTION

Figure 1:
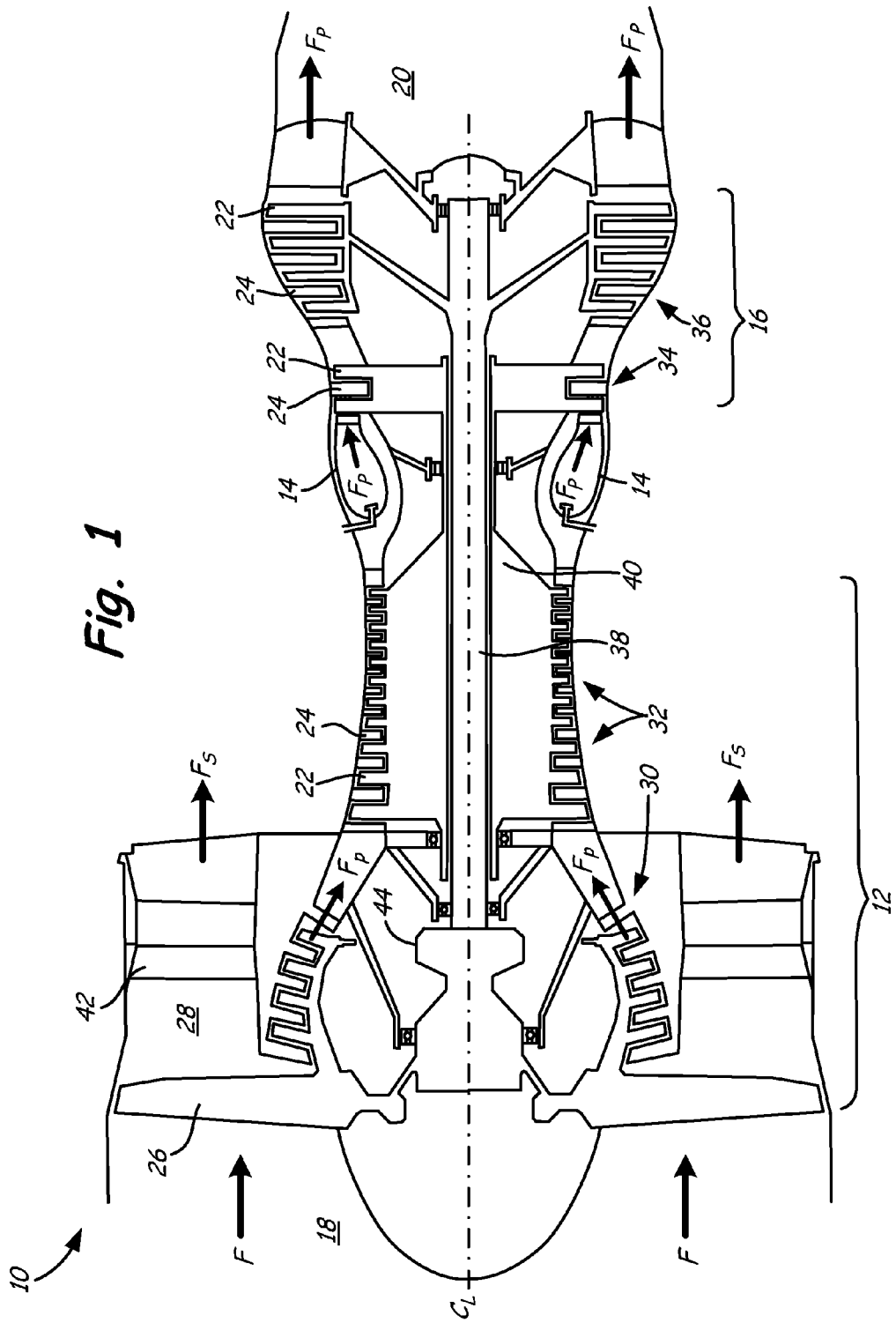
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below.

Suitable components include, but are not limited to, cooled gas turbine engine components in compressor sections 30 and 32, combustor 14, turbine sections 34 and 36, and exhaust section 20 of gas turbine engine 10.

Figure 2A:
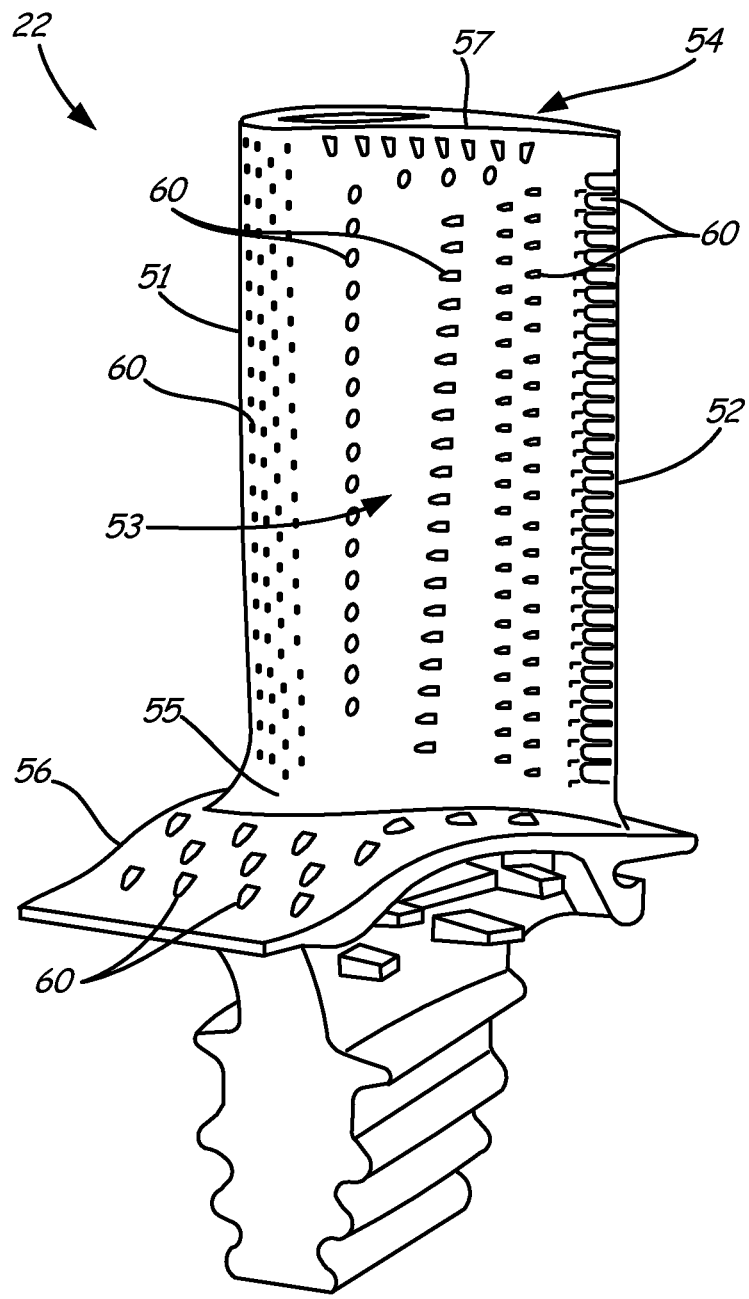
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
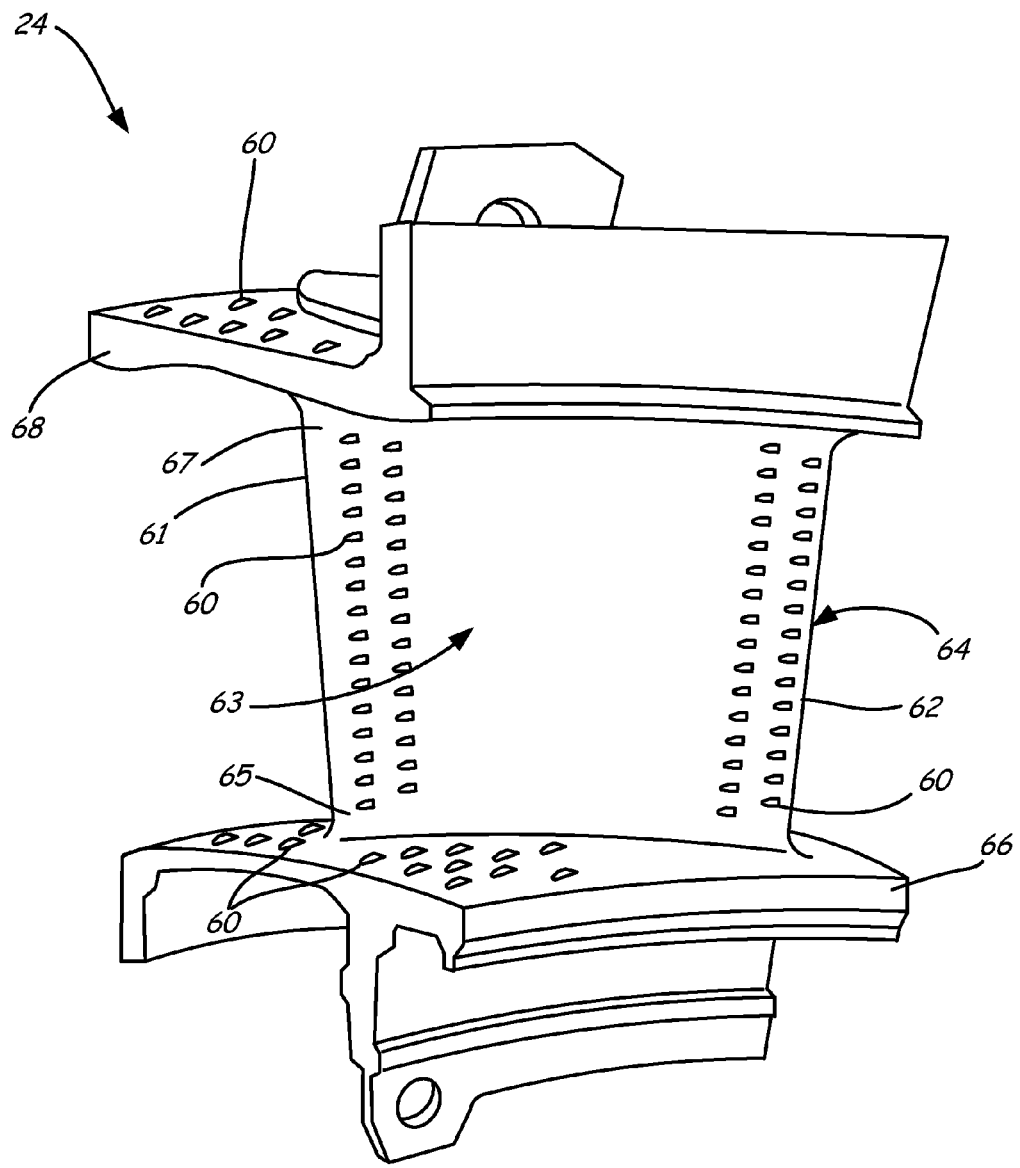
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The cooling holes described herein provide a cooling solution that offers improved film cooling coverage and eliminates or reduces some of the problems associated with conventional diffusion film cooling holes, particularly flow separation. The described crenellation features provide a cooling hole that offers improvements over the state of the art. Cooling holes with crenellation features provide improved film effectiveness and eliminate or reduce the likelihood of film separation.

Figure 3:
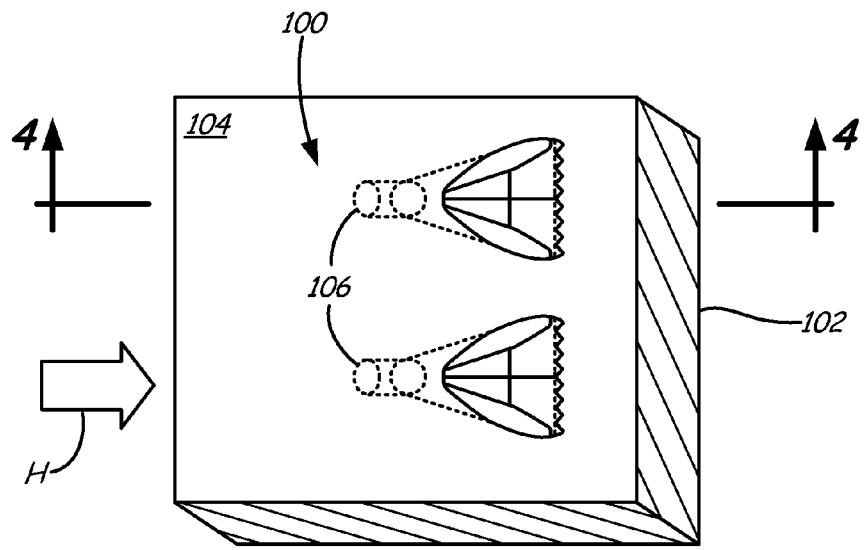
FIG. 3 is a view of a wall having cooling holes with crenellation features.

FIG. 3 illustrates a view of a wall of a gas turbine engine component having film cooling holes. Wall 100 includes first wall surface 102 and second wall surface 104. As described in greater detail below, wall 100 is primarily metallic and second wall surface 104 can include a thermal barrier coating. Cooling holes 106 are oriented so that their inlets are positioned on first wall surface 102 and their outlets are positioned on second wall surface 104. During gas turbine engine operation, second wall surface 104 is in proximity to high temperature gases (e.g., combustion gases, high temperature gases, hot air). Cooling air is delivered inside wall 100 where it exits the interior of the component through cooling holes 106 and forms a cooling film on second wall surface 104.

Cooling holes 106 can be arranged in a linear row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along second wall surface 104 (represented by arrow H). Here, the row of cooling holes 106 is substantially perpendicular to the direction of flow H. In alternate embodiments, the orientation of cooling holes 106 can be arranged on second wall surface 104 so that the flow of cooling air is substantially perpendicular to the high temperature gases (i.e. cooling air exits cooling holes 106 radially) or at an angle between parallel and perpendicular (compound angle). Cooling holes 106 can also be provided in a staggered formation on wall 100. Cooling holes 106 can be located on a variety of components that require cooling. Suitable components include, but are not limited to, turbine vanes and blades, combustors, blade outer air seals, augmentors, etc. Cooling holes 106 can be located on the pressure side or suction side of vanes and blades. Cooling holes 106 can also be located on the blade tip or blade or vane platforms.

Figure 4:
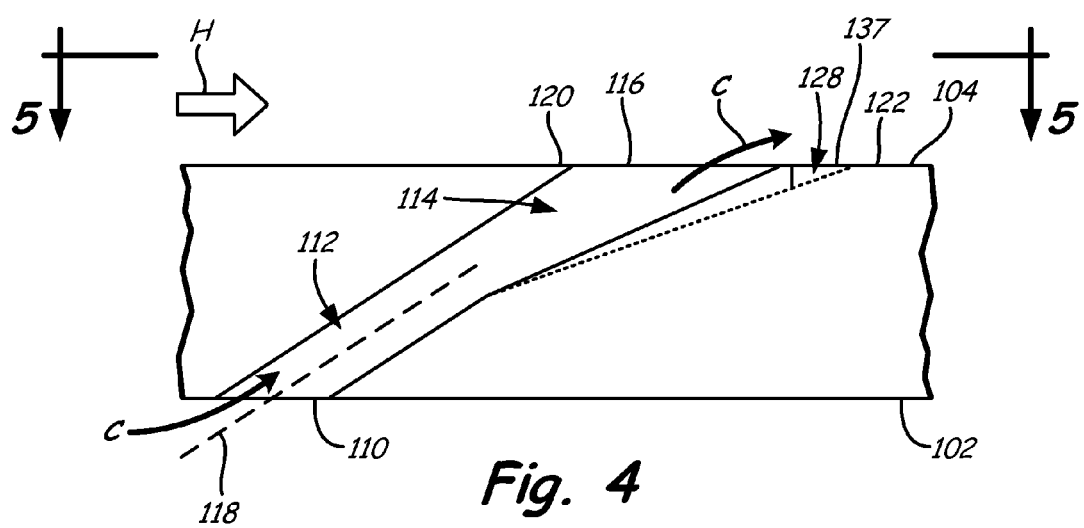
FIG. 4 is a sectional view of the cooling hole of FIG. 3 taken along the line 4-4.
Figure 5:
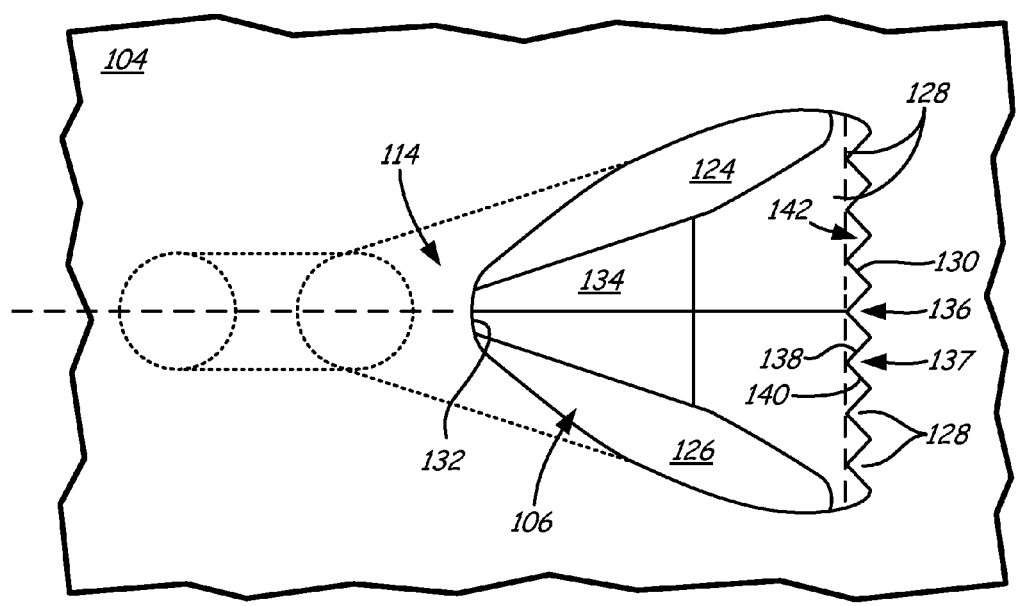
FIG. 5 is a view of the cooling hole of FIG. 4 taken along the line 5-5.

FIGS. 4 and 5 illustrate one embodiment of cooling hole 106 in greater detail. FIG. 4 illustrates a sectional view of cooling hole 106 of FIG. 3 taken along the line 4-4. Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of cooling air through cooling hole 106. In some embodiments, metering section 112 has a substantially constant flow area from inlet 110 to diffusing section 114. Metering section 112 can have circular, oblong (oval or elliptical) or racetrack (oval with two parallel sides having straight portions) shaped axial cross sections. In FIGS. 4 and 5, metering section 112 has a circular cross section. Circular metering sections 112 have a length l and diameter d. In some embodiments, inlet 110 and metering section 112 have the same diameter d. In some embodiments, circular metering section 112 has a length l according to the relationship: d≤l≤3d. That is, the length of metering section 112 is between one and three times its diameter. The length of metering section 112 can exceed 3d, reaching upwards of 30d. In alternate embodiments, metering section 112 has an oblong, racetrack-shaped, or other shaped cross section with a length l and hydraulic diameter $d_h$. In some embodiments, metering section 112 has a length l according to the relationship: $d_h \le l \le 3d_h$. That is, the length of metering section 112 is between one and three times its hydraulic diameter. Again, the length of metering section 112 can exceed $3d_h$, reaching upwards of $30d_h$. In some embodiments, metering section 112 is inclined with respect to wall 100 as illustrated in FIG. 4 (i.e. metering section 112 is not perpendicular to wall 100). Metering section 112 has a longitudinal axis represented by numeral 118. Alternatively, metering section 112 can be omitted from cooling hole 106. In these embodiments, diffusing section 114 extends from inlet 110 to outlet 116.

As shown in FIGS. 4 and 5, diffusing section 114 is adjacent to and downstream from metering section 112. Cooling air C diffuses within diffusing section 114 before exiting cooling hole 106 along second wall surface 104. Second wall surface 104 includes upstream end 120 (upstream of cooling hole 106) and downstream end 122 (downstream from cooling hole 106). Diffusing section 114 opens along second wall surface 104 between upstream end 120 and downstream end 122. As shown in FIG. 4, cooling air C diffuses away from longitudinal axis 118 in diffusing section 114 as it flows towards outlet 116. Diffusing section 114 can have various configurations. Diffusing section 114 can have multiple lobes as shown in FIGS. 4 and 5 and described in greater detail in U.S. Provisional Application No. 61/599,372, filed on Feb. 15, 2012 and entitled "MULTI-LOBED COOLING HOLE AND METHOD OF MANUFACTURE", and U.S. Provisional Application No. 61/599,379, filed on Feb. 15, 2012 and entitled "MULTI-LOBED COOLING HOLE AND METHOD OF MANUFACTURE", which are incorporated by reference. In this embodiment, diffusing section 114 includes lobes 124 and 126 as shown in FIG. 5. In other embodiments, diffusing section 114 is a more conventional diffusing section such as those described in U.S. Pat. No. 4,197,443 or U.S. Pat. No. 4,684,323.

Diffusing section 114 includes two or more crenellation features. FIGS. 4 and 5 illustrate crenellation features 128 within diffusing section 114. Diffusing section 114 includes trailing edge 130 where diffusing section 114 meets downstream end 122 of second wall surface 104. The general profile of trailing edge 130 (disregarding individual crenellation features 128) can be straight as shown in FIG. 5. Diffusing section 114 includes leading edge 132 where diffusing section 114 meets upstream end 120 of second wall surface 104. Diffusing section 114 also includes body 134, a surface within diffusing section 114 between inlet 110 and outlet 116. Crenellation features 128 can be located along trailing edge 130 as shown in FIG. 5.

As described below in greater detail, crenellation features 128 shown in FIG. 5 can be formed by removing material near trailing edge 130 of diffusing section 114. For example, in FIG. 5, crenellation features 128 are a plurality of V-shaped projections located along trailing edge 130. Each V-shaped projection 128 includes crenellation body 136 having first projecting surface 138 and second projecting surface 140. As shown in FIG. 5, crenellation body 136 (and first and second projecting surfaces 138 and 140) projects towards leading edge 132. Here, material upstream of first projecting surface 138 and second projecting surface 140 can be removed to form V-shaped projections 128. The material removed is indicated with numeral 142 in FIG. 5. When crenellation features 128 are located along trailing edge 130, material (142) can be removed from second wall surface 104 to create crenellation features 128. In embodiments where crenellation features 128 are located along trailing edge 130, crenellation bodies 136 have a surface (top surface 137) flush with second wall surface 104. FIG. 5 illustrates seven V-shaped projections 128 along trailing edge 130. As described below in greater detail, fewer and greater numbers of crenellation features 128 can be formed within diffusing section 114 depending on the location of cooling hole 106 and the necessary cooling solution.

Figure 6A:
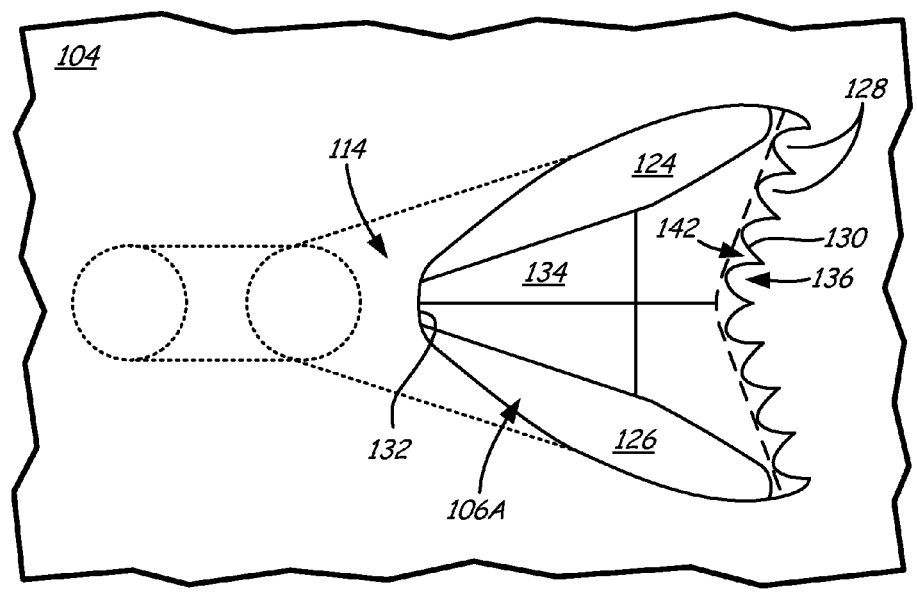
FIG. 6A is a view of a second embodiment of a cooling hole having crenellation features.
Figure 6B:
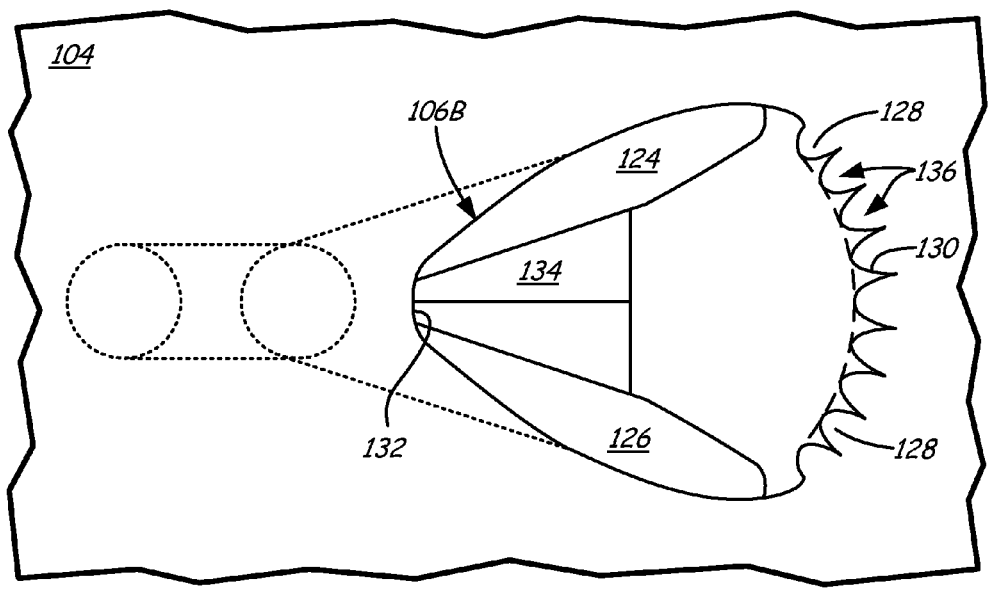
FIG. 6B is a view of a third embodiment of a cooling hole having crenellation features

Crenellation features 128 can take various shapes. FIG. 6A illustrates another embodiment of a cooling hole having multiple lobes (first and second lobes 124 and 126). Cooling hole 106A includes crenellation features 128 that are rounded projections along trailing edge 130 of diffusing section 114. Crenellation bodies 136 of crenellation features 128 project from trailing edge 130 towards body 134 and leading edge 132. In some embodiments, crenellation features 128 are elliptical. While the general profile of trailing edge 130 can be straight as shown in FIG. 5, the general profile of trailing edge 130 (disregarding individual crenellation features 128) can also be curved as shown in FIG. 6A and FIG. 6B. FIG. 6B illustrates another embodiment of a cooling hole (cooling hole 106B) having crenellation features and a concave trailing edge 130.

Figure 7:
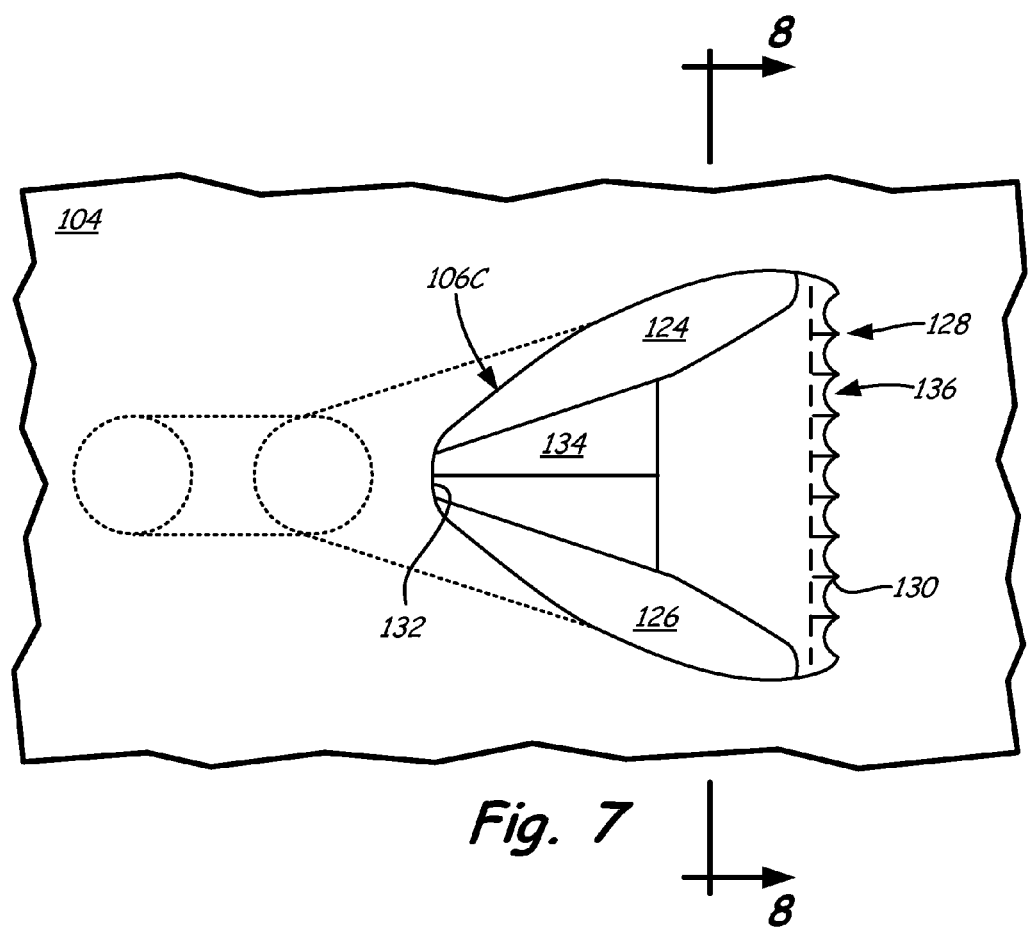
FIG. 7 is a view of a fourth embodiment of a cooling hole having crenellation features.
Figure 8:
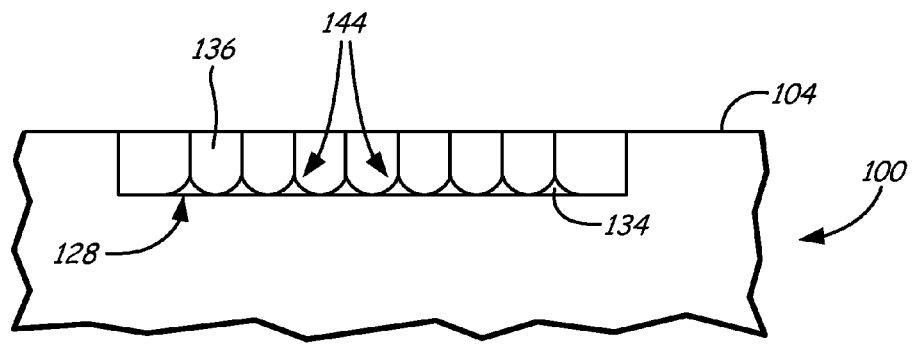
FIG. 8 is a section view of the cooling hole of FIG. 7 taken along the line 8-8.

FIGS. 7 and 8 illustrate another embodiment of a cooling hole 106 (cooling hole 106B), in which crenellation features 128 include rounded projections from trailing edge 130 and ridges located upstream of trailing edge 130 between the projections. FIG. 7 illustrates a plan view of cooling hole 106C, showing crenellation features 128, each having a rounded crenellation body 136 projecting towards leading edge 132. Crenellation features 128 also include ridges 144, which are located between adjacent crenellation bodies 136. In some embodiments, ridges 144 can extend from trailing edge 130 upstream past crenellation bodies 136 as shown in FIG. 7. FIG. 8 illustrates a section view of the downstream portion of diffusing section 114 of cooling hole 106C taken along the line 8-8. FIG. 8 shows crenellation features 128 from a portion of diffusing section 114. Ridges 144 are elevated with respect to body 134 of diffusing section 114. In some embodiments, ridges 144 form a series of grooves between adjacent ridges 144 as shown in FIG. 8.

Figure 9:
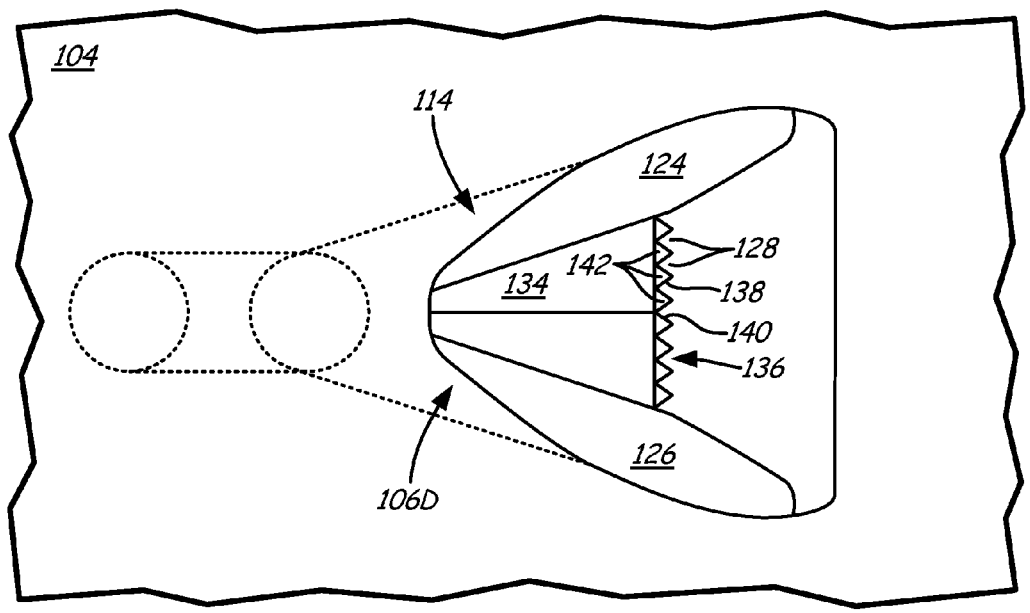
FIG. 9 is a view of a fourth embodiment of a cooling hole having crenellation features.

While FIGS. 5 through 8 show crenellation features only along or near trailing edge 130, crenellation features 128 can also be located within diffusing section 114 on body 134 as shown in cooling hole 106D in FIG. 9. Material can be removed from body 134 (at areas 142) to form crenellation features 128. Removing material from body 134 creates pockets in diffusing section 114. Crenellation features 128 function as projections relative to the surface body 134 where material was removed. Material can be removed from virtually anywhere on body 134 to create crenellation features 128. A row of crenellation features 128 can be formed as shown in FIG. 9. Alternatively, multiple rows of crenellation features 128 can be formed or material can be removed from body 134 to form individual or a staggered arrangement of crenellation features 128.

Crenellation features 128 improve the filling of diffusion section 114 with cooling air C. In conventional diffusing-type cooling holes, the lateral edges of the diffusing sections do not always fill completely (i.e. the top and bottom portions of diffusing section 114 as shown in FIG. 5). When this occurs, the flow of air can separate at the "corners" (lateral extremities at the trailing edge) of the diffusing section and the film of cooling air formed at the cooling hole outlet can have holes or gaps. Crenellation features 128 improve the filling of diffusion section 114 by forcing cooling air C to spread laterally and reduce or eliminate flow separation within diffusion section 114. The projections of crenellation features 128 (e.g., first and second projecting surfaces 138 and 140) encourage cooling air C to move laterally and fill the entire width of diffusion section 114 at trailing edge 130 or within body 134, depending on the location of crenellation features 128. By improving the filling of diffusion section 114, cooling hole 106 is able to provide a better film of cooling air along second wall surface 104 and cool the gas turbine engine component. Producing a better film of cooling air provides cooling solution flexibility. The number of cooling holes 106 needed to cool the component can be reduced or the component can be exposed to higher temperature environments without overheating occurring.

The number of crenellation features 128 present in cooling hole 106 can vary depending on a number of factors. Exemplary embodiments of cooling holes 106 will include at least two crenellation features 128. The maximum number of crenellation features 128 that can be located in a cooling hole will depend on the size of the cooling hole and the size of crenellation features 128. Current manufacturing methods can form crenellation features 128 having a width of about 0.0254 mm (1 mil). Future technology may provide for the manufacture of smaller crenellation features 128. A large number of crenellation features 128 can provide better lateral spreading of cooling air C. The width of crenellation features 128 can be varied to control the distribution of cooling air C to provide an improved film of cooling air along downstream end 122 and second wall surface 104.

FIGS. 5 through 9 illustrate crenellation features 128 that are roughly equal in size to the others in each drawing. The sizes of crenellation features 128 can vary. For example, cooling hole 106 can have wider crenellation features 128 near the center of trailing edge 130 or body 134 and narrower crenellation features 128 near the lateral edges of trailing edge 130 or body 134. Alternatively, cooling hole 106 can have narrower crenellation features 128 near the center of trailing edge 130 or body 134 and wider crenellation features 128 near the lateral edges of trailing edge 130 or body 134. In embodiments in which crenellation features 128 are formed by material removal, the depth of material removed from area 142 can also vary to form crenellation features 128 having different relative heights.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance, reproducibility, or manufacturing rate.

Suitable manufacturing techniques for forming the cooling configurations described here include, but are not limited to, electrical discharge machining (EDM), laser drilling, laser machining, electrical chemical machining (ECM), water jet machining, casting, conventional machining, masking and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 10A:
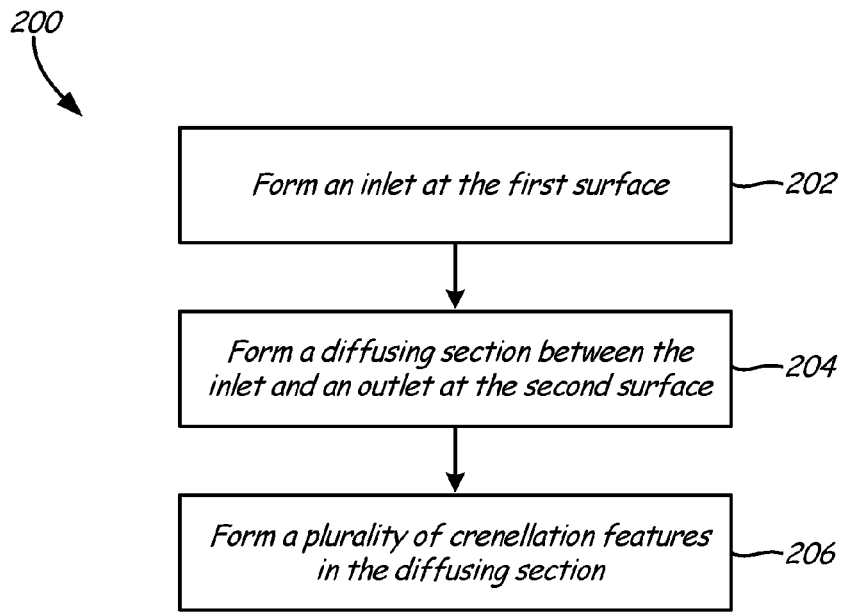
FIG. 10A is a simplified flow diagram illustrating one embodiment of a method for producing a cooling hole having crenellation features in a gas path wall.

FIG. 10A is a simplified flow diagram illustrating one embodiment of a method for producing a cooling hole having crenellation features in a gas turbine engine wall having first and second surfaces. Method 200 includes forming a metering section between the first and second surfaces (step 202), forming a diffusing section between the metering section and the second surface (step 204) and forming a plurality of crenellation features in the diffusing section (step 206). Metering section 112 is formed in step 202 by one or more of the casting, machining or drilling techniques described above. The technique(s) chosen is/are typically determined based on performance, reproducibility and manufacturing rate. In embodiments where step 202 occurs prior to step 204, inlet 110 and portions of diffusing section 114 and outlet 116 can also be formed during formation of metering section 112. Diffusing section 114 is formed in step 204 by one or more of the casting, machining or drilling techniques described above. As with metering section 112, the technique(s) chosen is/are typically determined based on performance, reproducibility and manufacturing rate. In embodiments where step 202 occurs prior to step 204, outlet 116 is fully formed during step 204. Once diffusing section 114 has been formed in step 204, crenellation features 128 are formed in step 206. In exemplary embodiments, crenellation features 128 are formed by material removal using high-speed EDM. In high-speed EDM methods, a small hollow spindle (or similar) electrode is used to machine areas 142. High-speed EDM methods are described in greater detail in U.S. Provisional Application No. 61/599,366, filed on Feb. 15, 2012 and entitled "EDM METHOD FOR MULTI-LOBED COOLING HOLE", which is incorporated by reference.

Figure 10B:
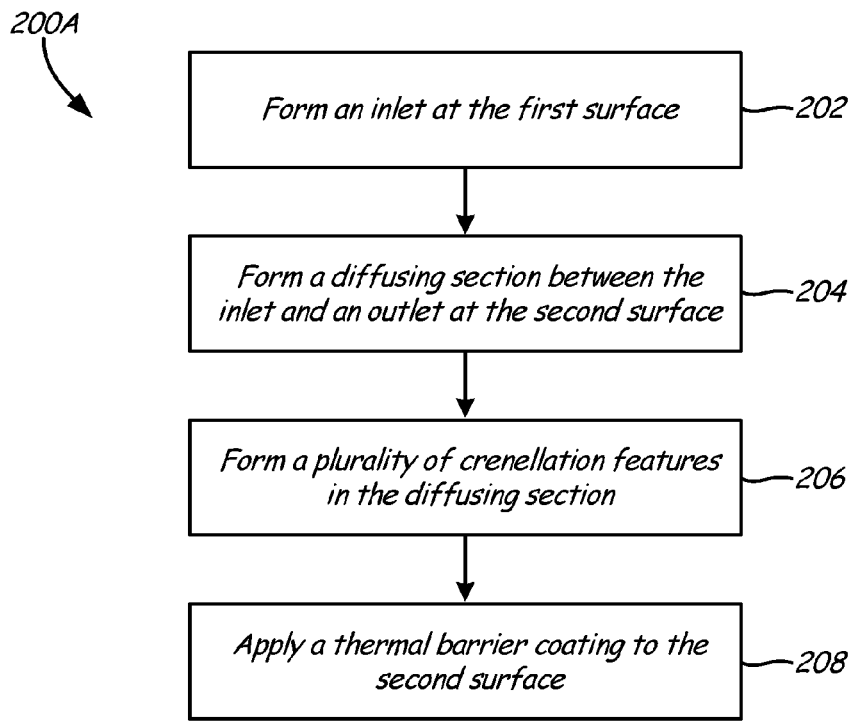
FIG. 10B is a simplified flow diagram illustrating another embodiment of a method for producing a cooling hole having crenellation features in a gas path wall.

Steps 202, 204 and 206 can be performed before or after an optional thermal barrier coating application. In optional step 208 (shown as a step in method 200A in FIG. 10B), a thermal barrier coating is applied to second wall surface 104. Application of the thermal barrier coating can also include the application of a bond coating prior to the thermal barrier coating. Steps 202, 204, 206 and 208 can be performed in any order depending on the location of cooling hole 106, the location of diffusing section 114 relative to the metallic wall and the thermal barrier coating and the location of crenellation features 128 within diffusing section 114. As previously stated, the order of steps 202, 204, 206 and 208 can affect the machining or drilling techniques chosen for steps 202, 204 and 206.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

DISCUSSION OF POSSIBLE EMBODIMENTS

The following are non-exclusive descriptions of possible embodiments of the present invention.

A gas turbine engine component can include a wall having first and second wall surfaces and a cooling hole extending through the wall. The cooling hole can include an inlet located at the first wall surface, an outlet located at the second wall surface and a diffusing section in communication with the inlet and extending to the outlet. The diffusing section can include a plurality of crenellation features.

The system of the preceding paragraph can optionally include, additionally and/or alternatively any, one or more of the following features, configurations and/or additional components:

the diffusing section can include a trailing edge where the diffusing section meets the outlet, and the plurality of crenellation features can be located in the diffusing section along the trailing edge;

the trailing edge can have a profile that is generally straight;

the trailing edge can have a profile that is generally curved;

the diffusing section can include a leading edge opposite the trailing edge, and the plurality of crenellation features can project from the trailing edge towards the leading edge;

the diffusing section can include a body region upstream of the outlet, and the plurality of crenellation features can be located on the body region;

the crenellation features can include V-shaped projections;

the crenellation features can include rounded projections;

the crenellation features can include grooves; and/or the cooling hole can further include a metering section between the inlet and the diffusing section, and the diffusing can further include a first lobe diverging longitudinally and laterally from the metering section and a second lobe adjacent the first lobe and diverging longitudinally and laterally from the metering section.

A wall of a component of a gas turbine engine can include first and second surfaces and a cooling hole extending between an inlet at the first surface and an outlet at the second surface. The cooling hole can include a diffusing section in communication with the metering section and terminating at the outlet and a plurality of crenellation features.

The system of the preceding paragraph can optionally include, additionally and/or alternatively any, one or more of the following features, configurations and/or additional components:

the diffusing section can include a trailing edge where the diffusing section meets the outlet, and the plurality of crenellation features can be located in the diffusing section along the trailing edge;

the trailing edge can have a profile that is generally straight;

the trailing edge can have a profile that is generally curved;

the diffusing section can include a leading edge opposite the trailing edge, and the plurality of crenellation features can project from the trailing edge towards the leading edge;

the diffusing section can include a body region upstream of the outlet, and the plurality of crenellation features can be located on the body region;

the crenellation features can include V-shaped projections;

the crenellation features can include rounded projections;

the crenellation features can include grooves; and/or the diffusing section can further include a first lobe diverging longitudinally and laterally from the metering section and a second lobe adjacent the first lobe and diverging longitudinally and laterally from the metering section.

A wall having first and second surfaces can include a cooling hole with a plurality of crenellation features. A method for producing the cooling hole can include forming an inlet at the first surface, forming a diffusing section between the inlet and an outlet at the second surface and forming a plurality of crenellation features in the diffusing section. The inlet can meter a flow of fluid through the cooling hole, and the diffusing section can distribute the flow of the fluid to form a film of cooling fluid at the outlet at the second surface of the gas turbine engine wall.

The system of the preceding paragraph can optionally include, additionally and/or alternatively any, one or more of the following features, configurations and/or additional components:

the crenellation features can be formed by removing material from the diffusing section.

The invention claimed is:

1. A gas turbine engine component comprising:
a wall having first and second opposing wall surfaces and defining a cooling hole, the cooling hole extending from an inlet located at the first wall surface to an outlet located at the second wall surface and having:
a diffusing section in communication with the inlet and extending to the outlet, wherein the diffusing section includes a leading edge formed at an upstream end of the outlet and a trailing edge formed at a downstream end the outlet generally opposite the upstream end; and
a plurality of crenellation features located along the trailing edge, wherein each crenellation feature includes a crenellation body that projects from the trailing edge and generally towards the leading edge.

2. The component of claim 1, wherein the trailing edge has a profile that is generally straight.

3. The component of claim 1, wherein the trailing edge has a profile that is generally curved.

4. The component of claim 1, wherein the crenellation bodies comprise V-shaped projections.

5. The component of claim 1, wherein the crenellation bodies comprise rounded projections.

6. The component of claim 1, wherein the crenellation features comprise grooves.

7. The component of claim 1, wherein the cooling hole further comprises a metering section between the inlet and the diffusing section, and wherein the diffusing section further comprises:
a first lobe diverging longitudinally and laterally from the metering section; and a second lobe adjacent the first lobe and diverging longitudinally and laterally from the metering section.

8. A wall of a component of a gas turbine engine, the wall comprising:
first and second wall surfaces;
an inlet located at the first wall surface;
an outlet located at the second wall surface;
a metering section commencing at the inlet and extending downstream from the inlet;
a diffusing section extending from the metering section and terminating at the outlet, wherein the diffusing section comprises a leading edge formed at an upstream end of the outlet and a trailing edge formed at a downstream end of the outlet; and
a plurality of crenellation features located along the trailing edge, wherein each crenellation feature includes a crenellation body that projects from the trailing edge and generally towards the leading edge.

9. The wall of claim 8, wherein the trailing edge has a profile that is generally straight.

10. The wall of claim 8, wherein the trailing edge has a profile that is generally curved.

11. The wall of claim 8, wherein the crenellation features comprise V-shaped projections.

12. The wall of claim 8, wherein the crenellation features comprise rounded projections.

13. The wall of claim 8, wherein the crenellation features comprise grooves.

14. The wall of claim 8, wherein the diffusing section further comprises:
a first lobe diverging longitudinally and laterally from the metering section; and
a second lobe adjacent the first lobe and diverging longitudinally and laterally from the metering section.

15. A method for producing a cooling hole having a plurality of crenellation features in a wall having first and second surfaces, the method comprising:
forming an inlet at the first surface, wherein the inlet meters a flow of fluid through the cooling hole;
forming a diffusing section between the inlet and an outlet at the second surface, wherein the diffusing section includes a leading edge formed at an upstream end of the outlet and a trailing edge formed at a downstream end the outlet generally opposite the upstream end; and
forming a plurality of crenellation features in the diffusing section, wherein each crenellation feature includes a crenellation body that projects from the trailing edge and generally towards the leading edge.

16. The method of claim 15, wherein the crenellation features are formed by removing material from the diffusing section.

17. A gas turbine engine component comprising:
a wall having first and second opposing wall surfaces and defining a cooling hole, the cooling hole extending from an inlet located at the first wall surface to an outlet located at the second wall surface and having:
a diffusing section in communication with the inlet and extending to the outlet, wherein the diffusing section includes a leading edge formed at an upstream end of the outlet and a trailing edge formed at a downstream end the outlet generally opposite the upstream end; and
a plurality of crenellation features located within the diffusing section upstream of the trailing edge, wherein each crenellation feature includes a crenellation body that projects generally towards the inlet.

18. The component of claim 17, wherein the trailing edge has a profile that is generally straight.

19. The component of claim 17, wherein the trailing edge has a profile that is generally curved.

20. The component of claim 17, wherein the crenellation bodies comprise V-shaped projections.

21. The component of claim 17, wherein the crenellation bodies comprise rounded projections.

22. The component of claim 17, wherein the crenellation features comprise grooves.

* * * * *